April 16, 1963   H. PATTERSON   3,085,838
LUBRICATION MEANS
Filed Jan. 25, 1961
Fig 1
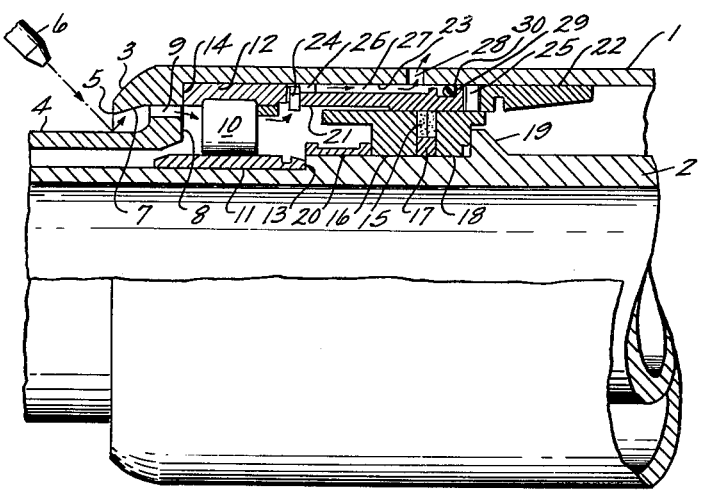
Fig 2
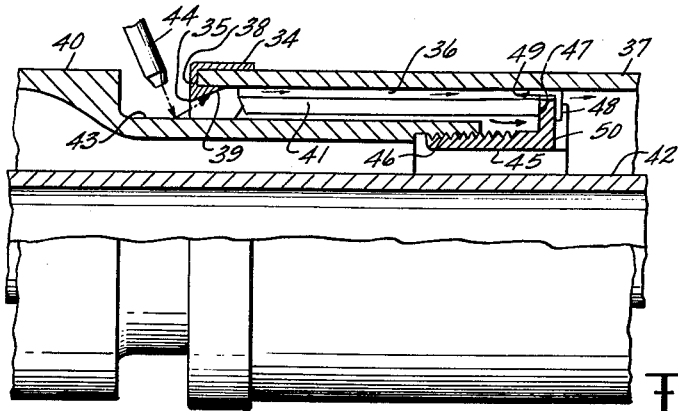
Fig 3
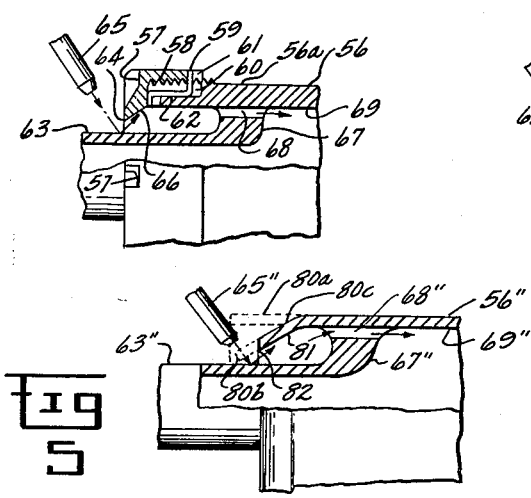
Fig 4
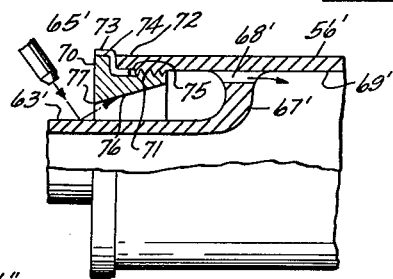
Fig 5
INVENTOR.
HERBERT PATTERSON
BY
Lawrence G. Norris
ATTORNEY United States Patent Office 3,085,838
Patented Apr. 16, 1963

3,085,838
LUBRICATION MEANS
Herbert Patterson, West Peabody, Mass., assignor to General Electric Company, a corporation of New York
Filed Jan. 25, 1961, Ser. No. 84,830
2 Claims. (Cl. 308—187)

This invention relates to lubrication means and more particularly to means for conducting lubricant to the interior of a hollow rotatable shaft.

It is the primary object of the present invention to provide improved means for supplying lubricant to the interior of a shaft from an external supply.

It is a further object of this invention to provide improved means for supplying lubricant to the interior of a hollow shaft at a point spaced longitudinally along the shaft.

It is a further object of the invention to provide improved means for supplying a continuous and uniform flow of lubricant to the interior of a hollow shaft through the periphery thereof.

Further objects and advantages of the invention will become apparent as the following description proceeds.

In many machines utilizing hollow rotatable shafts, it is desirable to supply lubricant to bearings or other mechanisms located interiorly of the shaft; for example, bearings interposed between concentric relatively rotatable shafts ordinarily require lubrication. Lubricant may also be necessary for cooling mechanisms such as running seals. In machines in which it is not feasible or desirable to inject lubricant into a shaft at an end thereof, means must be provided for supplying the lubricant through the periphery of the shaft at a point spaced between its ends. Machines in which driving connections are made with a shaft at both ends thereof may necesitate the provision of such lubricating means.

According to a preferred embodiment of the present invention, we provide improved means for supplying lubricant to the interior of a hollow shaft, which comprise a circumferential lip extending about the shaft together with means for spraying lubricant into a circumferential opening formed between the lip and the shaft. The lubricant is directed against the shaft at such an angle that it is deflected against the interior surface of the lip. According to a feature of the invention, the interior surface of the lip diverges outwardly from the opening thereof. This divergence causes centrifugal force to establish a flow of lubricant from the opening toward the interior of the lip, thereby preventing the lubricant from escaping from the lip. An interior surface of greater diameter than the opening is provided within the shaft, so that the lubricant flows longitudinally from the lip into this surface and thence to the interior bearings or other mechanisms which it is desired to lubricate.

While the specification concludes with claims specifically pointing out the subject matter which I regard as my invention, it is believed that the invention will be more clearly understood from the following detailed description of preferred embodiments thereof, taken in connection with the accompanying drawing, in which:

FIG. 1 is an elevation, partially in section, of a concentric shaft arrangement incorporating one embodiment of the invention;

FIG. 2 is an elevation, partially in section, of another embodiment of the invention;

FIG. 3 is an elevation, partially in section, of a single shaft arrangement, showing a further modification;

FIG. 4 is a view similar to FIG. 3, but showing another modification; and

FIG. 5 is a similar view, showing still a further modification.

Referring to FIG. 1, my improved lubrication means is shown in an arrangement of concentric relatively rotatable shafts, including an outer shaft having a portion 1 to which it is desired to supply lubricant, and an inner shaft 2. Such a shaft arrangement has a great variety of applications, but may, for example, be utilized in a turboshaft engine. Although the improved lubrication means may be employed with advantage in a single hollow shaft, it is particularly desirable in concentric shaft arrangements in which bearings are located between the shafts to provide for relative rotation, and in which it is inconvenient to supply lubricant from either end of the shafts. In a turboshaft engine, for example, it may be desired to drive mechanisms from both ends of the shafts, in a manner which precludes the introduction of lubricant at those points. In such a case, it is necessary to supply lubricant to the shaft through its periphery at a point spaced between its ends.

The lubricating means includes an annular lip 3, which overhangs a reduced portion 4 of the shaft and provides an annular opening 5 thereabout. I further provide a nozzle 6 through which a stream of lubricant is sprayed under pressure by a suitable pump (not shown) against the periphery of the reduced portion 4 of the shaft. The nozzle 6 is arranged to direct the lubricant against the shaft at such an angle that the lubricant is deflected toward an interior surface 7 of the lip 3, in the direction shown by the arrows. The surface 7 diverges outwardly from the opening 5, with the result that during rotation of the shaft, centrifugal force causes the lubricant to flow in a direction away from the opening 5, precluding its escape from the lip.

The shaft portions 1 and 4 thereof are connected by a radial flange 8 spaced longitudinally from the opening 5. The lubricant passes to the interior of the shaft through a plurality of circumferentially spaced ports 9 formed in the flange 8. While the ports 9 cannot be circumferentially continuous, the annular lip is effective to provide a uniform and substantially continuous flow of lubricant to the interior of the shaft, provided that the ports 9 are closely spaced. Centrifugal force spreads the flow of lubricant uniformly over the circumference of the interior surface 7 of the lip.

A plurality of roller bearings 10, which rotatably support the inner shaft 2 concentrically within the outer shaft, are supplied with lubricant by the previously described means. The bearings run upon an inner race 11 and an outer race 12, which abut shoulders 13 and 14 formed in the inner and outer shafts, respectively. In the embodiment shown, a carbon ring seal 15 is provided to confine the lubricant to the bearing 10. The seal is supported for rotation with the shaft 2 by means of suitable ring elements 16, 17, and 18, which are spaced on the shaft between a flange 19 formed therein and a retaining ring 20 shrunken thereon. The carbon seal bears upon the interior surface of a seal runner 21, which is positioned between the outer race 12 and a retaining ring 22. The retaining ring has a shrink fit upon an interior surface 23 of the shaft portion 1. The runner engages the outer race and the ring 22 by means of interfitting circumferentially spaced teeth 24 and 25, respectively. The lubricant flowing from the bearings 10 passes through the teeth 24 and thence axially through a plurality of circumferentially spaced openings 26 formed in the runner 21, axially through an annular recess 27 formed in the runner, and radially out of the shaft through a scavenge port 28 to a suitable sump. The runner is provided with an annular groove 29 receiving an O-ring seal 30, which engages the interior surface 23 to prevent leakage of the lubricant along the shaft. The bearing and seal arrangements just described form no part of the present invention, but are intended to illustrate the function of the improved lubrication means.

Another embodiment of the lubrication means is shown in FIG. 2, in which an annular lip member 34 is formed separately from the shaft to decrease machining costs and to permit its individual replacement in the event of damage. The lip member 34 provides an annular opening 35 having a smaller radius than the interior surface 36 of an outer shaft portion 37. The lip member, which is press-fitted upon an overhanging portion 38 of the shaft, provides a divergent surface 39 which induces flow of lubricant into the interior of the shaft through the action of centrifugal force established by the rotation of the shaft.

In this modification, the outer shaft comprises the shaft portion 37 and a further shaft portion 40, which are drivingly connected by means of a spline 41 and are mounted for relative rotation concentrically about an inner shaft 42 by suitable bearing means (not shown). The shaft portion 40 has an end section 43 of reduced diameter, into which a lubricant nozzle 44 extends. The nozzle is arranged to spray a stream of lubricant at a suitable angle against the end section 43 for deflection through the opening 35 to the surface 39, from which it passes between the teeth of the spline 41 in the direction shown by the arrows. Centrifugal force causes the lubricant to flow in a uniform annular stream upon the interior surface 36, the stream being limited in depth by the diameter of the opening 35.

The shaft portions 37 and 40 are secured in assembled relation by means of a bolt 45 threaded into the interior of the shaft 40 at 46. The bolt is secured in place against an end surface 47 of the spline by means of a locking clip 49 received between the teeth of the spline, and having a spring finger 48 deformed into engagement with a slot 50 formed in the head of the bolt 45. The shaft portions 37 and 40 are assembled, and the bolt 45 is threaded into place, by means of wrenches inserted axially into the shaft, in a manner well known to those skilled in the art. The lubricant flows along the interior surface 36 and around the bolt 45 as shown by the arrows, to bearings or other mechanisms which it is desired to lubricate or to cool. This modification has the advantage of reduced cost of manufacture and replaceability of the lip 34.

A further modification of the lubrication means is shown in FIG. 3, in conjunction with a single shaft having a portion 56 to which lubricant is to be supplied. A lip 57 is again formed as a member separate from the shaft, and is threaded at 58 on an overhanging portion 56a thereof. The lip is locked in position by means of a locking clip 59, which is received in a notch 60 formed longitudinally of the shaft through the threads, and whose ends are bent into locking engagement with suitable notches 61 and 62 formed in the ends of the lip and the shaft, respectively. The shaft is formed with a portion 63 of reduced diameter, about which an annular opening 64 formed by the lip 57 extends. A nozzle 65 is arranged to spray lubricant against the periphery of the shaft portion 63 at such an angle that the lubricant is deflected against a diverging frusto-conical surface 66 of the lip. The shaft is provided with a radial flange 67 spaced longitudinally from the lip, interconnecting the portions of the shaft. The radial flange is formed with a plurality of circumferentially spaced ports 68, through which the stream of lubricant flows to a cylindrical interior surface 69, which is of greater diameter of the opening 64. The mode of operation of these lubrication means is similar to that of the means of FIGS. 1 and 2.

In a modification shown in FIG. 4, parts similar to those shown in FIG. 3 are similarly numbered, with prime super-scripts. A lip 70 is internally threaded at 71 into an overhanging portion 72 of the shaft 56'. The lip is locked in place by means of a locking strip 73 received in a notch 74 formed in the lip, and in a groove 75 formed longitudinally through the thread 71 in the portion 72. The lip is formed with an interior frusto-conical diverging surface 76, which provides an annular opening 77 about the shaft portion 63'.

A further modification, showing a method of spinning the lip from a portion of the shaft, is shown in FIG. 5, in which parts similar to those of FIG. 3 are similarly numbered, with double prime super-scripts. The shaft 56'' is formed with an overhanging cylindrical portion 80a, which is shown in dotted lines in an initially machined form. The overhanging portion is first spun by a well-known process into a frusto-conical form shown in dotted lines at 80b. The protruding end is then machined to form a lip 80c having a diverging interior surface 81 and providing an annular opening 82 about the reduced shaft portion 61''. The mode of operation of the modified forms of the lubrication means is similar to that of the previously described embodiments.

It will be apparent from the foregoing description that I have provided improved means for supplying a continuous and uniform flow of lubricant to the interior of a hollow shaft through the periphery thereof. Various changes and modifications will readily occur to those skilled in the art, and it is my intention to cover all such changes and modifications in the appended claims.

What I claim and desire to secure by Letters Patent of the United States is:

1. The combination comprising a shaft including an annular portion and a cylindrical portion of reduced diameter, said annular portion longitudinally overhanging and circumferentially spaced about said cylindrical portion, means drivingly interconnecting said annular portion and said cylindrical portion and providing ports for fluid flow communication between the exterior of said shaft and the interior of said annular portion, means rotatably supporting said shaft, an annular lip formed integrally with said annular portion spaced circumferentially about said cylindrical portion to form an annular opening therebetween, said lip formed with a circumferential interior surface diverging from said opening, means for spraying a stream of lubricant against the periphery of said cylindrical portion at an angle to deflect said stream interiorly of said lip, said annular portion formed with a circumferential interior surface of greater diameter than said opening positioned to receive said stream of lubricant from said interior of said lip and deliver said stream to said ports.

2. The combination comprising an inner shaft, an annular outer shaft circumferentially spaced about said inner shaft, bearing means interposed between said shafts and mutually supporting said shafts for relative rotation about a common axis, said outer shaft including a first portion having an interior surface extending circumferentially about said bearing means and a second portion of reduced diameter spaced longitudinally from said first portion, a lip circumferentially spaced about said second portion and forming an annular opening therebetween, said opening having a smaller diameter than said interior surface of said first portion, said lip formed with an interior surface diverging from said opening and extending toward said interior surface of said first portion, a radially extending flange interconnecting said first and second portions and interposed between said interior surfaces of said lip and said first portion, said flange formed with ports connecting said interior surfaces in fluid flow communication so as to deliver a stream of lubricant from the interior surface of said lip to the interior surface of said first portion, and means for spraying a stream of lubricant against the periphery of said second portion to deflect said stream to the interior surface of said lip.

References Cited in the file of this patent
UNITED STATES PATENTS

| | | |
|---|---|---|
| 2,112,754 | Annen | Mar. 29, 1938 |
| 2,449,942 | Johnson | Sept. 21, 1948 |
| 2,874,803 | Gunberg | Feb. 24, 1959 |
| 2,878,894 | Andrews | Mar. 24, 1959 |
| 2,992,842 | Shevchenko et al. | July 18, 1961 |